Feb. 4, 1936.  E. V. J. TOWER  2,029,515
CLUTCH TRANSMITTING DISK
Filed March 8, 1930  3 Sheets-Sheet 1
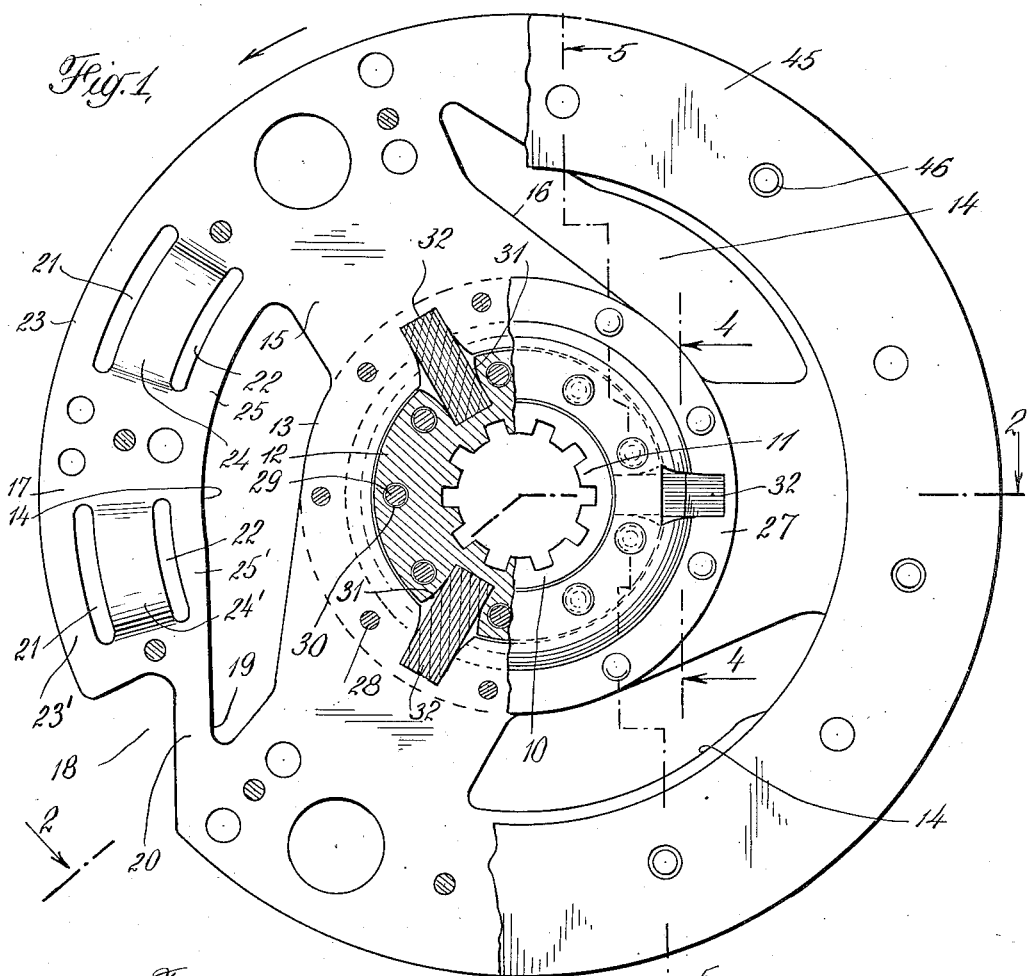
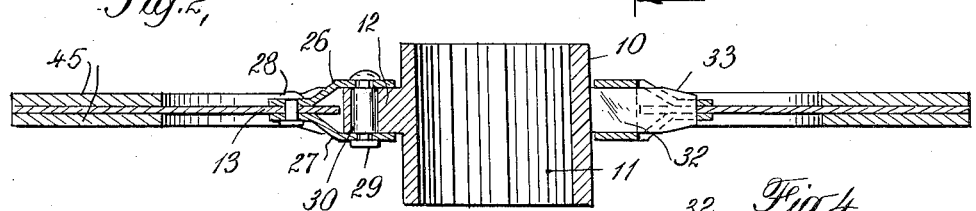
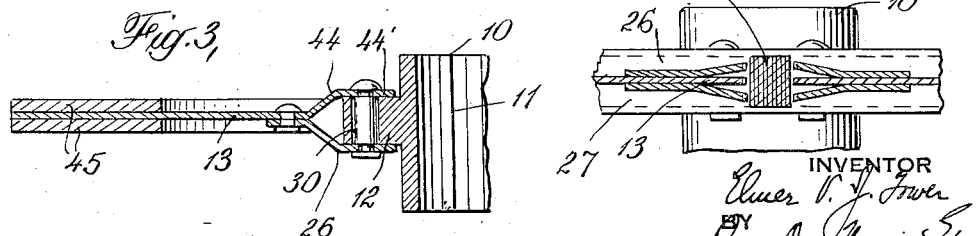
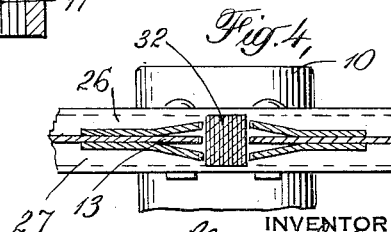
INVENTOR
Elmer V. J. Tower
BY
Pennie Davis Marvin Edmonds
ATTORNEYS

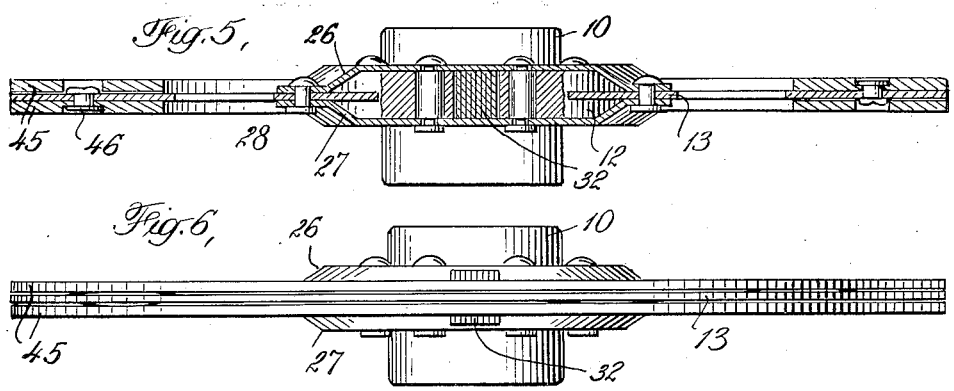

Feb. 4, 1936.　　　　E. V. J. TOWER　　　　2,029,515
CLUTCH TRANSMITTING DISK
Filed March 8, 1930　　　3 Sheets-Sheet 3
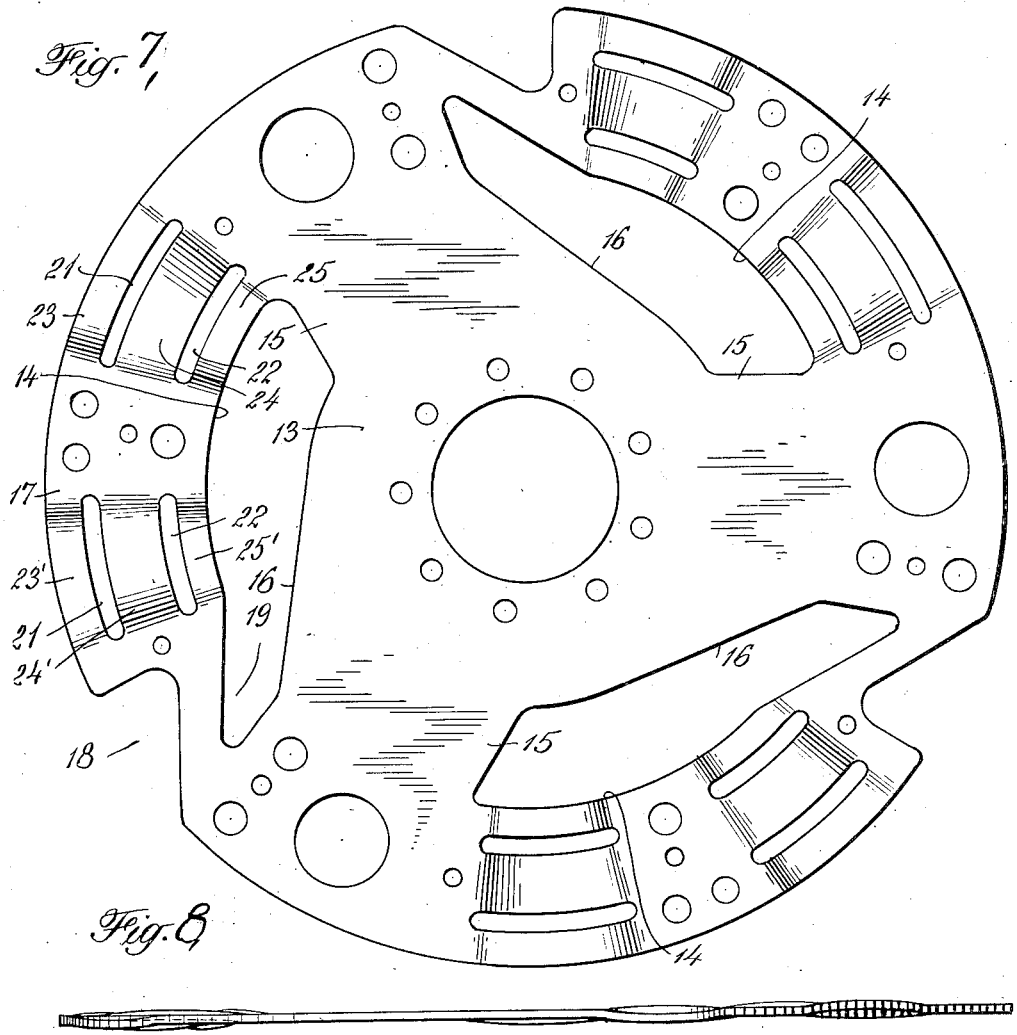
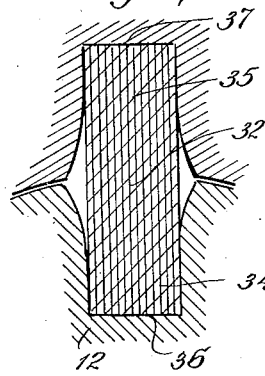
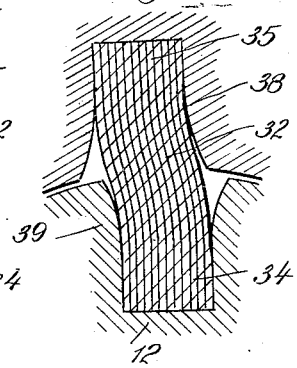
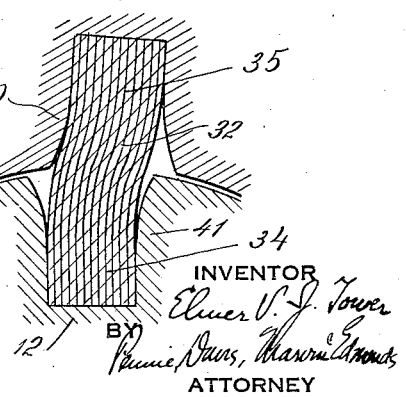
INVENTOR
Elmer V. J. Tower
BY
ATTORNEY Patented Feb. 4, 1936

2,029,515

UNITED STATES PATENT OFFICE 2,029,515

CLUTCH TRANSMITTING DISK

Elmer V. J. Tower, North Syracuse, N. Y., assignor, by direct and mesne assignments, of one-half to The Russell Manufacturing Company, Middletown, Conn., a corporation of Connecticut, and one-half to Brown-Lipe Gear Company, Toledo, Ohio, a corporation of New York Application March 8, 1930, Serial No. 434,256

3 Claims. (Cl. 192—68)

This invention relates to clutches of the type used in motor cars and is concerned more particularly with the construction of a transmitting element or plate for use in clutches of the single disk or twin types.

Clutches of ordinary construction heretofore in common use in motor cars for transmitting power from the motor to the transmission shaft also transmit torsional vibration generated by such motors at definite periods, and this vibration passes on to the transmission shaft and the rest of the driving mechanism, due to its intermittent action, causing a disagreeable transmission clatter beside causing these parts to vibrate in an unpleasant manner. It has accordingly been proposed to incorporate in the transmitting elements of clutches resilient driving connections between the disk and the hub, these connections being intended to absorb and dampen torsional vibration and prevent it from reaching the transmission shaft. The expedients heretofore used for the purpose have included rubber blocks, coil springs, and the like, but so far as I am aware, transmitting elements in which such connections have been employed have not been completely successful for the purpose intended, because the connections used were so heavily constructed as to operate inefficiently and in some instances the devices are wholly inoperative at the different periods of motor vibration.

The present invention is accordingly directed to the provision of a transmitting element which is provided with means by which periodic torsional vibration generated by the motor may be absorbed and dampened and the shocks incident to faulty clutching operations similarly absorbed. This element includes a resilient connection between the disk and hub of novel construction and capable of use efficiently in connection with motors of varying characteristics.

The resilient connection of my invention may be employed not only in a transmitting element in the form of an integral disk of sheet metal but in a disk of the fabricated type, such as that disclosed and claimed in my patents numbered 1,922,645 and 1,965,325.

The disk is mounted on the hub in such fashion as to have a limited freedom of angular movement with respect to the hub and this movement is controlled by the resilient connection which takes the form of a plurality of radially extending bundles of leaf springs, each of which is mounted at one end in the hub and at the other end in the disk. Relative angular movement between the disk and the hub is resisted by the springs and they thus absorb periodic torsional motor vibration and shocks arising from faulty manipulation of the clutch, and dampen such vibration due to inter-leaf friction.

For a better understanding of the invention, reference may be made to the accompanying drawings in which Fig. 1 is a face view of one form of the new element with parts broken away or shown in section;

Fig. 2 is a sectional view on line 2—2 of Fig. 1;

Fig. 3 is a similar sectional view showing a modified construction;

Figs. 4 and 5 are sectional views respectively on the lines 4—4 and 5—5 of Fig. 1;

Fig. 6 is an edge view of the element;

Fig. 7 is a face view of the disk alone;

Fig. 8 is an edge view of the disk, and

Figs. 9, 10, and 11 are diagrammatic views illustrating the action of the torsional vibration dampener.

Referring now to the drawings, the element is shown as comprising a hub 10 provided on its inner surface with a plurality of splines 11 for effecting driving engagement with the transmission shaft. This hub has a circumferential flange 12.

Mounted on the hub is a disk 13 of flat sheet metal provided with a plurality of openings 14 defining spokes 15. Preferably the disk is formed with an odd number of spokes, such as three, the spokes being spaced at equal angles. It has been found that vibration in a clutch transmitting element tends to be set up along diametrical lines and when an odd number of spokes is employed, the vibration set up in one spoke is distributed between a pair of spokes on the opposite side of the hub and the vibration is thus lessened. In order further to distribute and dampen such vibration, the spokes are not radially formed but the trailing edge 16 of each spoke extends tangent to a circle concentric with the hub. Vibration set up in each spoke, therefore, is not transmitted along radial lines toward the hub but along tangential lines.

The outer ends of the spokes are connected by a sectional rim 17 and at the forward end of each section the rim is cut away on its opposite edges, as indicated at 18 and 19, to provide a relatively narrow bridge strip 20 which extends at an angle to the inner and outer edges of the rim and connects the forward end of each section to the trailing edge of the next adjacent spoke. These narrow strips of metal intersecting the arc of the rim render the rim flexible and permit its distortion out of the main plane of the disk. At the same time, they prevent excessive distortion of the disk during processing before the friction material is applied.

The rim sections are provided with circumferentially extending openings 21 and 22 between spokes. Preferably the openings 21 and 22 are arranged in pairs and each section of the rim contains two pairs of openings. The openings lessen the weight, increase the flexibility of the rim and assist heat dissipation, but they are so disposed and proportioned as not to impair the strength of the construction. The arcuate strips of the rim 23, 24, 25 defined by openings 21 and 22 are distorted out of the plane of the rim, the strips 23 and 25 defined by one pair of openings 21, 22, being distorted out of the plane in one direction, while the strip 24 is distorted in the opposite direction. The strips 23', 24', and 25' defined by the next pair of openings 21, 22 in the section have the opposite distortion; that is, strips 23' and 25' have a distortion similar to that of strip 24 and strip 24' has the distortion of strips 23 and 25. The bulges in the friction facing produced by distortion of the strips cause the facing to come gradually into contact with the driver member of the clutch during clutching. At first, the facing makes contact at those places where it is bulged out by distorted portions of the rim which extend toward the face of the driver member, but under the action of the master clutch springs, the distorted strips of the rim are flattened out and complete contact of the friction facing with the driver member takes place.

The disk may be attached to the hub flange 12 by means of a pair of flat rings 26, 27, dished in opposite directions and secured rigidly to the disk adjacent its central opening by rivets or the like 28, the rings forming a channel in which the hub flange is received with working clearance. The rings are secured to but spaced from the flange by shoulder rivets 29 and the openings 30 in the hub flange 12 through which the rivets 29 pass are enlarged, as illustrated at Fig. 1, or the openings may be in elongated shape, as shown in Fig. 5 of my aforementioned Patent No. 1,965,325, so that the disk may have angular movement relative to the hub. The disk 13 projects inwardly beyond the rivets 28 and the diameter of the inner opening in the disk is slightly greater than the outer diameter of the flange 12.

The flange has formed in a plurality of recesses 31 which extend inwardly substantially to the face of the hub and through the flange from side to side. These recesses are preferably disposed one opposite each spoke on the disk and the recesses are generally radial, but the walls of the recesses are flaring. In each recess, there is a bundle of leaf springs 32 disposed so that the elements of each bundle lie at right angles to the plane of the disk. Each bundle projects outwardly beyond the outer surface of the hub flange into an opening cut in the inner edge of the disk 13, and the springs are of sufficient length so that they extend outwardly beyond the point of dishing of rings 26 and 27. The rings are cut away at the proper points and the walls of the rings which come into contact with the sides of the spring bundles are flaring, the outer corners 33 of the spring bundles projecting through the openings. The spring bundles thus extend between the bottoms of recesses in the hub and corresponding recesses in the disk, and the walls of these recesses are preferably curved to conform to the natural curvature assumed by the bundles when flexed under load.

When the walls are curved, the curvature of each wall of each recess is smooth and uniform, but the walls of each recess have short portions which lie parallel and engage the faces of the spring bundles closely. Beyond these portions, the walls begin to curve away from each other for a purpose to be described.

The distortion to which the springs are subjected is illustrated more clearly in Figs. 9 to 11, inclusive, in which the inner ends 34 of the spring bundles 32 are shown inserted in recesses in the hub flange 12, while the outer ends 35 are shown received in the openings cut in the rings 26, 27.

In Fig. 10, the spring bundle 32 is shown subjected to a driving stress, the side walls of the rings at the side 38 of the spring bundle transmitting driving force to the bundle which is in turn transmitted through the bundle to the hub at the side 39. The faces of the openings in the rings at the side 38 and the face of the recess in the hub flange at the side 39 are therefore driving surfaces, and when the load is applied, the spring bundle flexes in the manner shown in Fig. 10. By reason of the flare given the driving faces of the openings, the spring bundles are not subjected to a shearing action. When the faces are formed with a curvature conforming to the curvature of the springs under load, the area of each driving surface increases as the load increases; that is, as each bundle is subjected to a greater flexing action, the driving surfaces 38 and 39 make a more extended contact with the faces of the bundle, and the contact areas approach each other as the load increases. The load is thus distributed in accordance with requirements and a more effective action is obtained without concentrating the force in such a way as to injure the springs.

When the vehicle has been run at high speed and the throttle is quickly shut off, the inertia of the vehicle tends to maintain the motor at speed until the natural momentum of the vehicle is dissipated. In that situation, known as coasting, the spring bundles are reversely flexed in the manner illustrated in Fig. 11, where it will be seen that the walls of the openings in the rings at the side 40 and the wall of the hub recess at the side 41 are the surfaces which contact with the bundles and produce the distortion.

The spring bundles, due to their yielding in the manner described, not only serve to make the operation of the clutch smooth but also absorb periodic torsional vibration generated by the motor. Such vibration may occur during either driving or coasting and it tends to produce a relative angular movement periodic in form between the rim and the hub of the transmitting element. In the ordinary clutch member such periodic torsional vibration causes the entire transmitting element to vibrate in harmony with the motor with the result that the transmission shaft is not continuously under load but is subjected to a series of driving shocks as the power is transmitted to it or taken from it intermittently. With the present clutch, it is possible by a proper selection of the spring bundles with respect to the number of spring leaves therein, the thickness of the leaves and their stiffness and by proper formation of the driving and coasting surfaces in the disk and hub, to provide a range of yield between the rim and the hub which is greater than the greatest amplitude of the torsional vibration. The selection of the spring bundles with respect to stiffness of leaves may include variation in the stiffness of the leaves in different bundles, or variation of the stiffness of the leaves in a single bundle. As a consequence of said selection of bundles and variation in stiffness, torsional vibration generated by the motor merely causes the spring bundles to flex back and forth in the manner described but because the yield range in the transmitting element is greater than the amplitude of the vibration, the transmission shaft is continually subjected to either a driving or coasting force which does not vary. The result is that torsional motor vibration is absorbed in the transmitting element and is not transmitted to the transmission shaft, nor is it allowed to enter the transmission gears proper.

Where the periods of torsional vibration of the motor are different in driving and in coasting, the curvature of the driving and coasting surfaces of the two parts of the elements may vary. When it is desired to increase the range of flexure, the radius of curvature of the surfaces is decreased and under some conditions, the walls of the recesses may be cut away sharply so that the spring bundles come in contact with these walls only at the extreme limit of flexure. I prefer to employ recesses having curved walls, the curvature of which is selected properly for the conditions of operation, since in this way, the spring bundles are supported to a substantial extent during flexure.

By changing the number and stiffness of the spring leaves in the bundles and by changing the fit of the bundles in the recesses, the point in the operation of the clutch at which the yield takes place may be varied. If the number and stiffness of the leaves is increased, the load that must be applied before flexure takes place is similarly increased. Likewise if the leaves of the bundles are held in closer contact in the recesses, the spring bundles are stiffer and a greater load must be imposed before yielding occurs.

I am aware that it has been proposed in clutch transmitting elements to employ resilient connections between the hub and friction surfaces either in the form of rubber blocks or coil springs usually disposed generally circumferentially. In such transmitting elements, the resilient members operate in the same way during both driving and coasting and it is not possible to construct the transmitting element so that the varying requirements during driving and coasting occurring in some motors may be taken care of. Also, the rubber blocks or coil springs used have been incorporated in the transmitting element apparently without exact knowledge as to their effect. It has apparently not been known that these elements must have a yield in excess of the amplitude of the torsional vibration if they are to be effective to insure that the transmission shaft will be under a constant driving load throughout the range of operation of the motor. Also, it has been customary to employ resilient elements of relatively great stiffness and as a consequence in many of these transmitting elements, the resilient connection between the hub and rim is too stiff to absorb and dampen torsional vibration, the periods of which occur at relatively low motor speeds.

With the present construction, the varying requirements of different motors may be closely met by proper selection of the number and size of the leaves of the spring bundles and by proper formation of the driving and coasting surfaces which contact with the spring bundles. The resilient connection in the present element between the rim and the hub not only serves to prevent the transmission of torsional motor vibration to the motor shaft, but also tends to dampen such vibrations due to friction between the leaves of the spring bundles. As the bundles are flexed to the condition illustrated in Fig. 10, for example, the leaves throughout the bundle move relatively and the wiping action of the leaf faces against one another counteracts and absorbs the torsional vibration in a manner which cannot be accomplished with rubber blocks or the like. Due to the variable abutting action of the driving and coasting faces against the outer leaves of the spring bundles, the bundles are protected against shearing stresses and, as the load applied to them increases, they contact with driving or coasting surfaces of greater area.

With the mounting of the spring bundles in the manner described, each bundle has a three-point balanced load application as between the hub and disc since at its inner end, the bundle is held between the uniformly curved surfaces of the recesses in the hub flange and at its outer end contacts with the uniformly curved slots formed in the two dished rings. As a result when the transmitting element is subjected to severe operating conditions, the bundles first undergo a uniform flexing action up to their combined capacity and then may be further flexed about the longitudinal axis of the bundles.

The incorporation of the flexible connection between the rim and hub not only relieves the transmission shaft of severe strains which would otherwise be applied to it during periods of torsional vibration generated by the motor but also improves the operation and life of the clutch as well as the life of the entire driving mechanism of the vehicle.

The two rings attached to the disk provide a straddle mounting for the disk on the hub flange, which is highly satisfactory for the purpose. The same type of straddle mounting, however, may be provided by the use of a single ring and such a construction is illustrated in Fig. 3. Here, the disk 13 is provided at its inner edge with an offset dished portion 44 which merges into an annular portion 44' lying parallel to the plane of the disk but offset therefrom. With a disk of this construction, only a single ring 26 is employed and the inner edge of the ring and of the portion 44' straddle the hub flange and are connected thereto in the manner previously described.

In the clutch the spoke construction employed with the numerous openings makes the element of light weight and of low inertia under spinning conditions in operation and the disk readily gives off heat, since air can flow through the disc in contact with the spokes. Cutting away the rim to leave the connecting portions 20 makes the rim highly flexible and thus insures that the disk will adapt itself to irregularities in either the clutch, fly-wheel or assembly, due either to faulty manufacture or installation.

It will be readily understood that the vibration dampener of this invention may be incorporated in a transmitting element which includes a single continuous disk of sheet metal, or a fabricated disk made up of separate spokes as illustrated in my co-pending patents above identified. Accordingly in the appended claims, the term "disk" is intended to cover either type of disk unless modified so as to confine its application to a specific form.

I claim:

1. A clutch plate which comprises a hub having a flange provided with radial pockets, a plurality of spring bundles, one in each pocket and projecting outwardly beyond the periphery of the flange, a disk on said hub, a pair of dished rings attached rigidly to said disk and straddling said elements and flange and being loosely attached thereto, said rings being operatively engaged with the free ends of said bundles.

2. A clutch plate which comprises a hub having a slotted flange forming radial abutments, a disk structure encircling the hub and angularly movable relatively thereto, said disk structure having inwardly flaring radial pockets, spring bundles secured at one end in the bottoms of the pockets with their inner ends extending between the abutments of the hub flange and forming a resilient driving connection between the hub and disk, and a pair of dished rings attached to either side of the disk and overlapping the hub flange and at least partially enclosing said spring bundles.

3. A clutch plate which comprises a hub having radial abutments, a disk encircling the hub and angularly movable relatively thereto, rings attached to the disk, said disk and rings having inwardly flaring substantially radial pockets, and spring bundles secured at one end in the bottoms of the pockets with their inner ends extending between the hub abutments, said spring bundles forming a resilient driving connection between the disk and the hub.

ELMER V. J. TOWER.